UNITED STATES PATENT OFFICE.

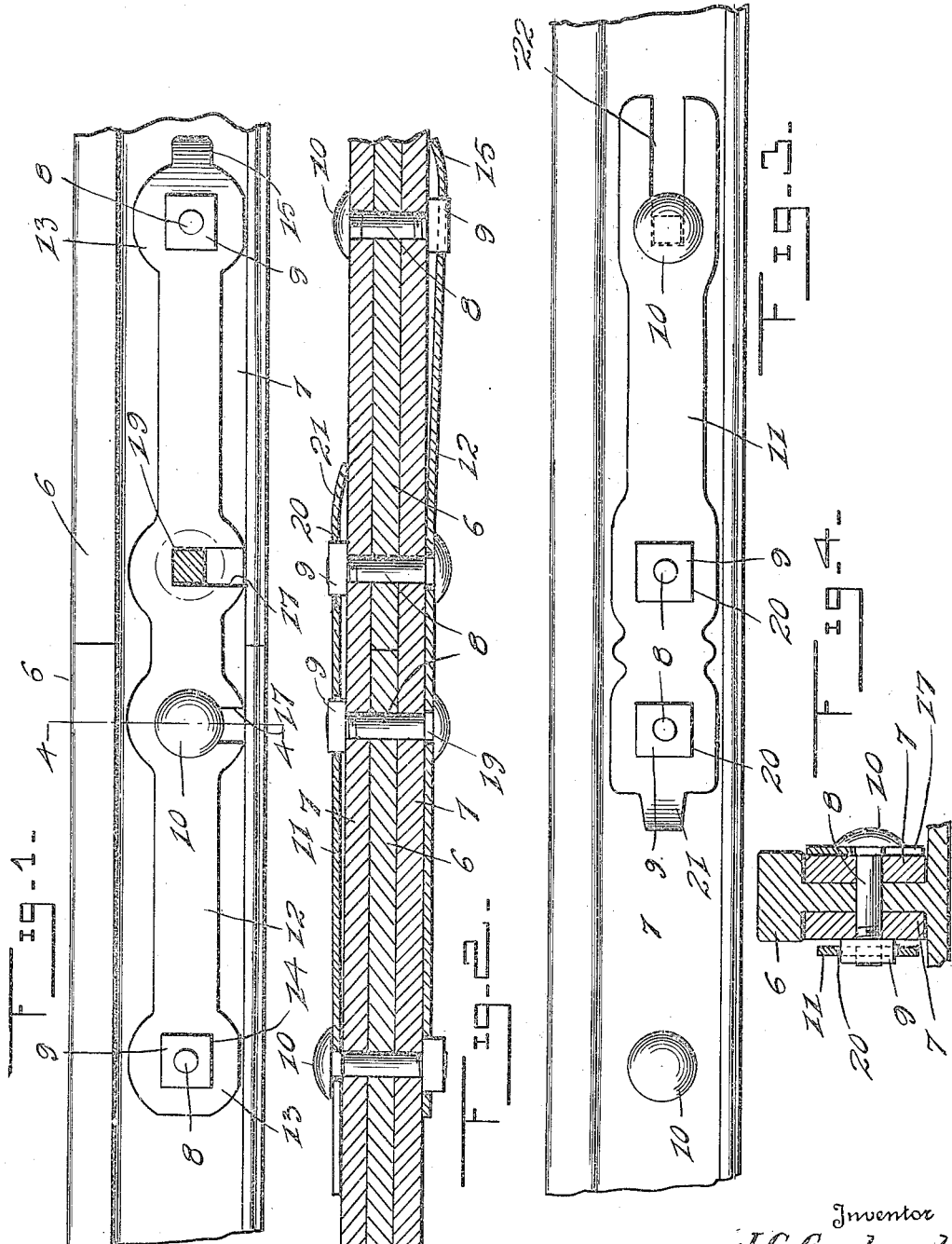

JOHN G. GARLAND AND JACOB A. CLINARD, OF HIGH POINT, NORTH CAROLINA.

NUT-LOCK.

1,232,024.    Specification of Letters Patent.    Patented July 3, 1917.

Application filed November 23, 1915. Serial No. 62,988.

*To all whom it may concern:*

Be it known that we, JOHN G. GARLAND and JACOB A. CLINARD, citizens of the United States, residing at High Point, in the county of Guilford and State of North Carolina, have invented certain new and useful Improvements in Nut-Locks; and we do hereby declare the following to be a full, clear, and exact description of the invention, such as will enable others skilled in the art to which it appertains to make and use the same.

This invention has for its primary object to provide a simple and efficient nut lock primarily designed for use in non-rotatably securing nuts used in fastening the adjacent ends of the rails of a railroad, but obviously is not necessarily limited to such use.

Another object is the provision of a nut lock embodying essentially two locking plates arranged in spaced relation, each of which is fastened in operative position beneath the head of one of the bolts and is provided with means for engaging the nuts of other bolts for non-rotatably securing said nuts.

With these and other objects in view, the invention consists in the novel construction, arrangement and formation of parts as will be hereinafter specifically described, claimed and illustrated in the accompanying drawing, in which:

Figure 1 represents a side elevation, partly in section, of the nut lock applied to use, Fig. 2 represents a longitudinal sectional view therethrough, Fig. 3 represents a side elevation of the side of the nut lock and railroad rails opposite that illustrated in Fig. 1, and Fig. 4 represents a transverse sectional view on the line 4—4 of Fig. 1.

Referring to the drawing in detail, wherein similar reference numerals designate corresponding parts throughout the several views, the numerals 6 indicate the adjacent end portions of two rails of a railway with which are engaged the usual fish plates 7 having apertures therein registering with the apertures formed in the web portions of the rails 6 for receiving bolts 8, whereby the adjacent ends of the rails are rigidly connected. The two inner bolts 8 are arranged in corresponding position while the two outer bolts are arranged in the opposite position, as clearly illustrated in Fig. 2 so as to permit of the application of our improved nut lock thereto. Nuts 9 are fitted upon the screwthreaded ends of the bolts 8 and the latter are provided with the usual heads 10.

The improved nut lock consists of two locking plates, designated generally by the numerals 11 and 12. The plate 12 extends from one end bolt to the opposite end bolt and is provided with enlarged ends 13, having polygonal apertures 14 therein adapted to snugly receive the nuts 9 of the end bolts to lock the latter against rotational movement with relation to the plate 12. One end 15 of the plate 12 is curved inwardly for retaining the adjacent portion in spaced relation to the adjacent fish plate 7 so as to permit the plate 12 to be readily grasped to facilitate removal thereof. The central portion of the locking plate 12 is formed with a pair of spaced parallel slots 17 extending a distance upwardly from the lower edge thereof and receiving the shanks of the two inner securing bolts 8. The medial slotted portion of the locking plate 12 is engaged by the heads of the innermost bolts 8 when the nuts 9 of the latter are advanced and the plate 12 is thus anchored in position.

The portions of the shanks of the bolts 8 adjacent the heads 10 are preferably squared in the usual manner, as indicated at 19, and are snugly fitted in the slots 17 so as to reliably retain the bolts against rotary movement with relation to the locking plate 12.

The other locking plate 11 is formed in one end with a pair of spaced polygonal apertures 20 shaped conformably with the nuts 9 of the two inner bolts 8 and adapted to snugly receive the latter. The plate 11 is considerably short than the plate 12 and the inner extremity thereof is formed with a reduced curved extension 21 engaging the adjacent fish plate 7 to retain the inner terminal of the plate in spaced relation to the fish plate, whereby it may be conveniently grasped to facilitate removal thereof. The opposite or outer end of the plate 11 is formed with a longitudinal and inwardly directed slot 22, adapted to receive the portion of one of the outer bolts 8 adjacent the head 10 thereof. The outer terminal of the plate 8 is reliably anchored in position beneath the head 10 of the bolt engaged in the slot 22, and thus resiliently retain the inner extremity thereof in operative engagement with the nuts 9 of the two innermost bolts.

In the practical use of the nut lock the locking plate 12 is anchored in position upon one of the fish plates 7 by the two intermediate bolts 8, thus resiliently retaining the outer enlarged nut-receiving ends 13 thereof in engagement with the nuts 9 of the opposite disposed end bolts 8. The other plate 11, which is disposed against the opposite fish plate 7, is anchored at one end under the head 10 of one of the end bolts 8, thus resiliently retaining the inner extremity thereof in operative engagement with the nuts 9 of the two innermost bolts.

In applying or removing the locking plates, the relatively short plate 11 is flexed so as to disengage the inner extremity thereof from the nuts 9 of the two inner bolts, thus permitting the inner nuts to be removed so as to relieve the pressure upon the central anchored portion of the other locking plate 12, which latter may be then removed. The relatively short locking plate 11 is subsequently removed by partially removing the nuts 9 associated with the bolt 8 by which the outer extremity of the plate 11 is locked in position.

What is claimed is:

1. In combination, a plurality of bolts, heads on said bolts, the inner bolts of the plurality being correspondingly arranged and the end bolts being disposed oppositely to the inner bolts, nuts fitted upon said bolts, a nut locking plate anchored in position under the heads of the inner bolts and having apertures adjacent the ends thereof non-rotatably receiving the nuts of the end bolts, and a second plate anchored in position under the head of one of the end bolts and having apertures non-rotatably receiving the nuts of the inner bolts.

2. In combination, a plurality of variously disposed bolts, heads on one end of said bolts, nuts fitted upon the opposite ends of said bolts, a locking plate having slots extending inwardly from adjacent the center of one longitudinal edge receiving the headed terminals of certain of said bolts, whereby the plate is anchored in position, and said plate also having apertures adjacent the ends thereof non-rotatably receiving nuts of other of the bolts.

In testimony whereof we affix our signatures in presence of two witnesses.

JOHN G. GARLAND.
JACOB A. CLINARD.

Witnesses:
J. L. SLEHURT,
J. M. HILLIARD.

Copies of this patent may be obtained for five cents each, by addressing the "Commissioner of Patents, Washington, D. C."